Aug. 10, 1965 R. J. DARBY ETAL 3,199,811
AUTOMATIC AIRCRAFT THROTTLE CONTROL APPARATUS
Filed Feb. 28, 1963 4 Sheets-Sheet 1
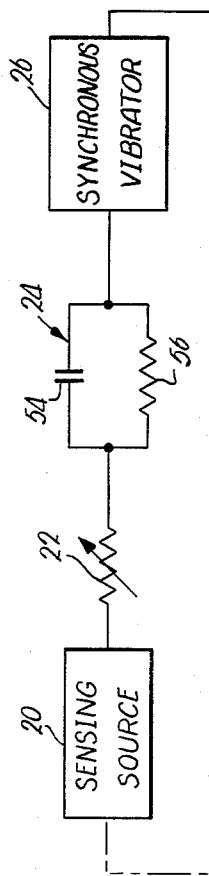
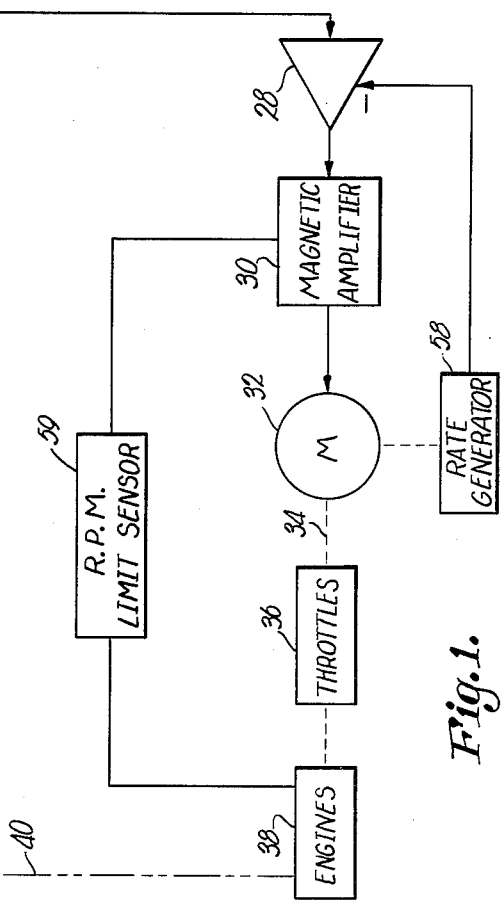
Fig.1.
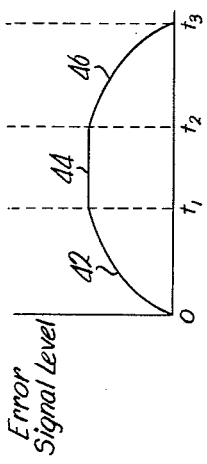
Fig.2.
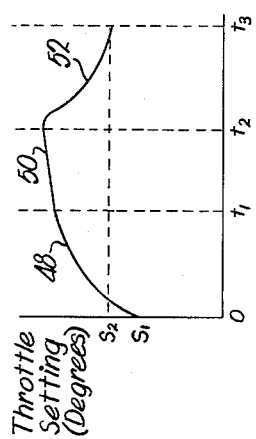
Fig.3A.
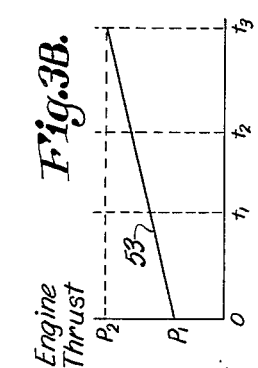
Fig.3B.
INVENTORS.
Robert J. Darby
Joseph F. Nemecek
BY Stanley G. Granger
Clarence H. Brainerd
Hovey, Schmidt, Johnson & Hovey,
ATTORNEYS.

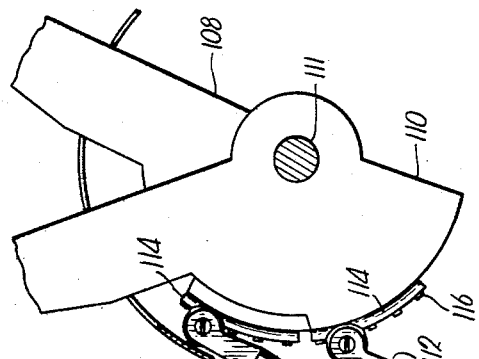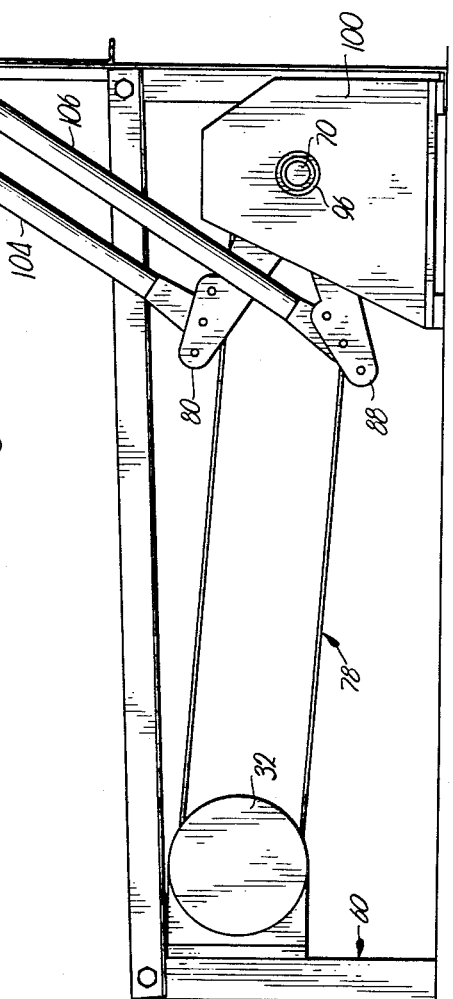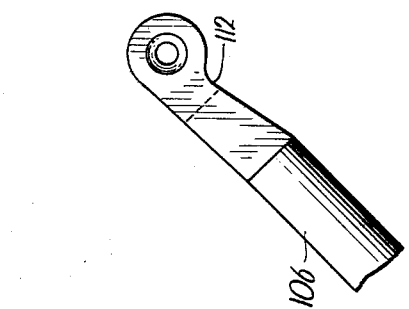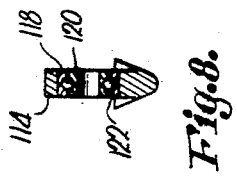

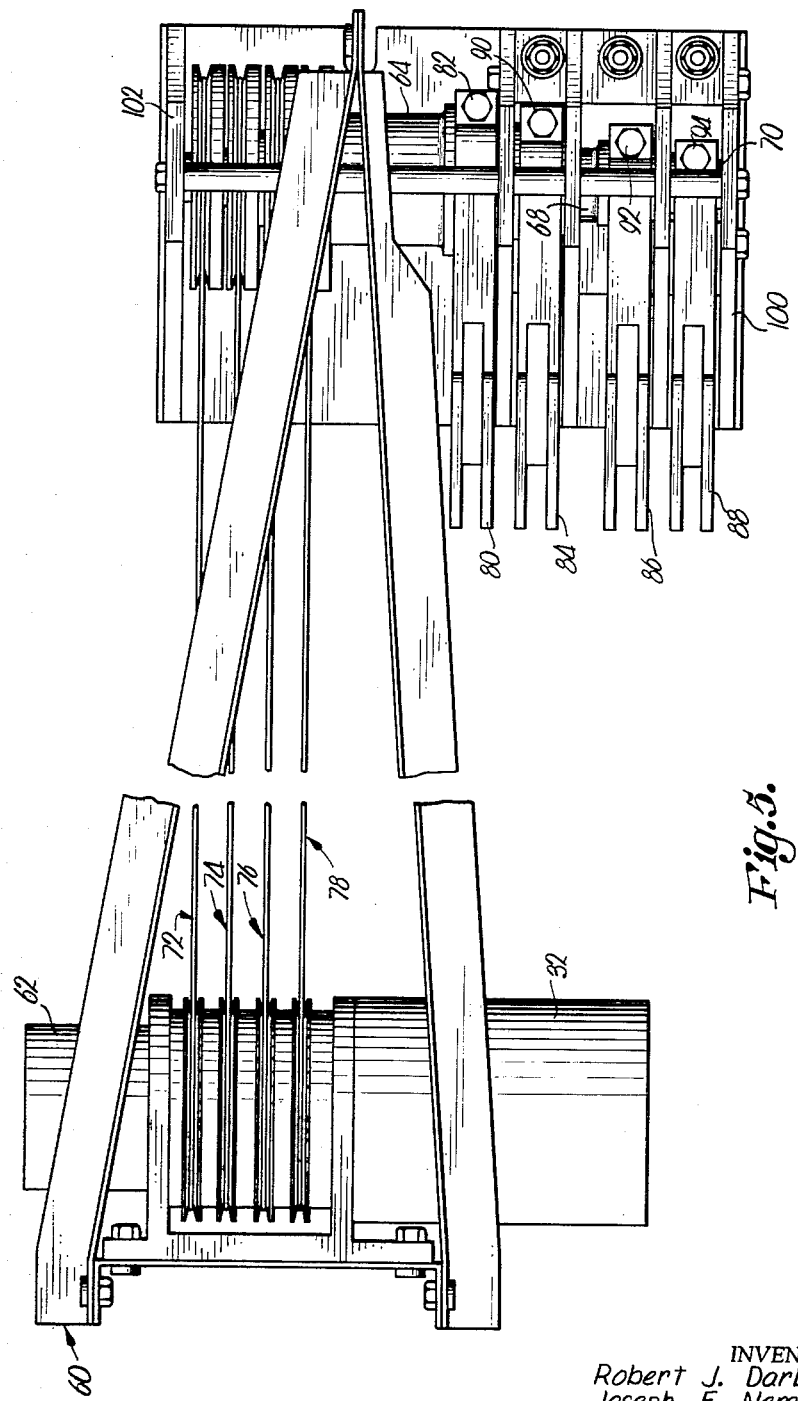

Aug. 10, 1965 R. J. DARBY ETAL 3,199,811
AUTOMATIC AIRCRAFT THROTTLE CONTROL APPARATUS
Filed Feb. 28, 1963 4 Sheets-Sheet 4

INVENTORS.
Robert J. Darby
Joseph F. Nemecek
BY Stanley G. Granger
Clarence H. Brainerd Hovey, Schmidt, Johnson & Hovey
ATTORNEYS.

United States Patent Office 3,199,811
Patented Aug. 10, 1965

3,199,811
AUTOMATIC AIRCRAFT THROTTLE CONTROL APPARATUS
Robert J. Darby, Parkville, and Joseph F. Nemecek, Kansas City, Mo., and Stanley G. Granger and Clarence H. Brainerd, Shawnee-Mission, Kans., assignors to Trans World Airlines, Inc., Kansas City, Mo., a corporation of Delaware
Filed Feb. 28, 1963, Ser. No. 261,628
4 Claims. (Cl. 244—76)

This invention relates generally to automatic aircraft throttle control and, more specifically, to means for maintaining referenced air speed of multiengine aircraft during decisive maneuvers such as landing, take-off, and other maneuvers where precise setting of the throttles is required.

The control of modern multiengine aircraft is a complex operation requiring highly trained and experienced personnel. Such is especially the case with commerical jet aircraft. Although the safety records of major airlines are impressive, the development of new control apparatus and the study of more reliable methods of operation are still a never-ending task confronting the aircraft industry.

This complexity of operation renders it desirable to relieve the pilot and the crew of as much of the control burden as possible. Such is especially the case when the aircraft is required to undergo decisive maneuvers that require the constant attention of the pilot or the combined effort of the aircraft crew in order that the maneuvers may be properly executed. Automatic regulation of the throttles under these conditions relieves the flight crew of the task of correctly combining throttle position with aircraft attitude in order to maintain proper air speed.

The use of automation, of course, should not be undertaken unless the automatic device contemplated can be considered many times more reliable than its human counterpart, while performing an assignment with at least the same degree of proficiency. Therefore, in the design and development of any apparatus for aircraft control, it is requisite that the highest degree of reliability possible be built into such apparatus.

A system recently developed to aid the pilot in anticipating changes in air speed is termed "SCAT" (Speed Control-Approach/Take-Off). (SCAT is manufactured by Safe Flight Instrument Corporation, White Plains, New York.) This system delivers a null-centered D.C. signal to an indicator on the control panel of the aircraft. This indicator is essentially a null-centered microammeter. As the aircraft starts to vary from referenced air speed, the pointer on the indicator so informs the pilot by swinging to one side or the other of center.

More specifically, the SCAT device consists of a wing mounted lift transducer, a SCAT signal summing unit, a flap position transmitter, and a SCAT indicator. The lift transducer and the flap position transmitter ascertain the lift coefficient existing at a given time on the air frame. An accelerometer mounted in the SCAT signal summing unit monitors horizontal acceleration. The summation of the lift coefficient on the air frame and the horizontal acceleration of the aircraft is displayed on the SCAT indicator. SCAT, therefore, is a device that generates an error signal if the summation of the lift coefficient of the air frame and the horizontal acceleration is above or below a predetermined or reference value for given air frame conditions. This value may be preset into the SCAT device thus providing a means for varying the SCAT setting for various air frames or for a variety of particular aircraft maneuvers. This feature is necessary since the desired reference on a given jet type aircraft during a maneuver, such as during the approach to landing, may be of an entirely different value than that desired for the same maneuver with a particular type prop aircraft.

The aforementioned predetermined or reference value commonly correspond to a value of air speed equal to the stall speed of the aircraft plus a safety factor which is on the order of 10 percent. As an aircraft begins its landing approach, it is often desired to vary the flap settings with full flaps being applied on the final approach. As the flap settings vary, the stall speed, aircraft drag, and hence the aircraft speed, will also vary. This, of course, is the primary reason for providing an aircraft with flaps because the flap surfaces, when extended, serve to increase the lift of the wing, lower the stall speed, and thus enable the aircraft to make a slower landing.

It may be appreciated that as the flap positions vary, the throttle settings must also be varied to hold the aircraft at the proper speed. In jet aircraft it is often necessary to advance the throttles as more flap is applied, even though air speed is to be decreased. This condition is created because of the drag that is impressed upon the air frame by the extending of the flap surfaces. Furthermore, the variation in the lift of the wing surfaces created by extending the flaps alters the lift coefficient on the wing, and also necessitates an adjustment in air speed.

It should be also be noted that SCAT is capable of anticipating subsequent changes in the lift coefficient due to the horizontal acceleration sensor which works in combination with the lift transducer. Therefore, the two parameters of the air frame viewed by the SCAT device are horizontal acceleration and the wing angle of attack. The significance of this manner of determining the proper air speed for a given maneuver is that such determination is entirely independent of the weight of the aircraft, atmospheric conditions, and other physical variables. SCAT looks entirely at the actual condition appearing on the wing surfaces which, of course, is the total effect of a multitude of factors that would be subject to human computation and judgment.

From the foregoing it is evident that SCAT is indeed an advancement over the method previously used to determine the optimum speed of an aircraft for proper approach and takeoff. Prior to SCAT it was necessary to calculate proper air speed from such variables as meteorological conditions, weight of the aircraft, etc., all of these being subject to human judgment. An error in such a calculation, of course, could jeopardize the safety of passengers, flight crews and aircraft, especially under difficult weather conditions where visibility is limited.

Briefly, the present invention is directed to apparatus for automatically controlling the throttle settings of an aircraft in response to an error signal from a source such as the aforementioned SCAT device. It should be understood, however, that it is not requisite in the operation of this invention that SCAT be employed to provide the error signal. A variety of sources having aerodynamic sensors for monitoring air frame conditions and generating an error signal in response thereto, could be utilized as the error signal source. It is evident that the aerodynamic factors to be monitored will depend upon the nature of the particular aircraft maneuver for which the apparatus of the present invention is to be employed to control. Therefore, under some circumstances it may be desired to sense air speed, Mach number, or some other aerodynamic parameter or combination of parameters depending on the particular aircraft maneuver that the invention is employed to automatically control.

It is, therefore, the primary object of this invention to provide an automatic control system responsive to deviations from optimum air frame conditions for maintaining a referenced air speed during aircraft approach to landing, take-off and other decisive aircraft maneuvers.

It is another object of this invention to provide such a control system that will properly regulate the throttles of the aircraft independently of human control.

It is another object of this invention to provide an automatic control system for maintaining the air speed of an aircraft at proper level regardless of variations in meteorological conditions, aircraft weight and the like.

It is still another object of this invention to provide an automatic control system which utilizes horizontal acceleration coupled with wing angle of attack sensing to maintain a certain referenced air speed during aircraft approach to landing, take-off, and other decisive aircraft maneuvers.

It is yet another object of this invention to provide apparatus for coupling a null-centered D.C. error signal from a sensing source with the aircraft throttles to effect automatically controlled actuation thereof.

Other objects will become apparent as the detailed description proceeds.

In the drawings:

FIGURE 1 is a combination block diagram and schematic diagram of the control apparatus and the over-all system function of the present invention;

FIG. 2 is a graph illustrating an output signal from the sensing source;

FIG. 3A is a graph showing a typical throttle setting response curve as produced by the output signal shown in FIG. 2;

FIG. 3B is a graph showing the corresponding engine thrust produced by the throttle response shown in FIG. 3A;

FIG. 4 is a side elevational view of the mechanical linkage interconnecting the servomotor shaft with the aircraft throttles;

FIG. 5 is a partial plan view of the mechanical linkage shown in FIG. 4;

FIG. 6 is a detailed view of the throttle interconnecting end of one of the links shown in FIG. 4;

FIG. 7 is a detailed view partially in section of a bearing assembly associated with a throttle for receiving the link end shown in FIG. 6;

FIG. 8 is a view taken along line 8—8 of FIG. 7;

Figure 11:
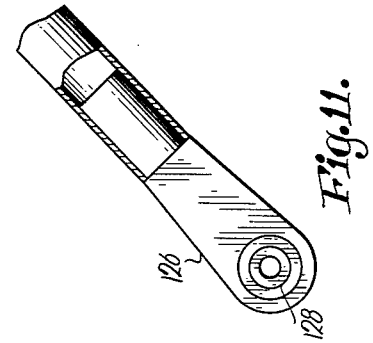
FIG. 11 is a detailed view partially in section and partially in elevation of the crank arm interconnecting end of one of the links shown in FIG. 4.
Figure 10:
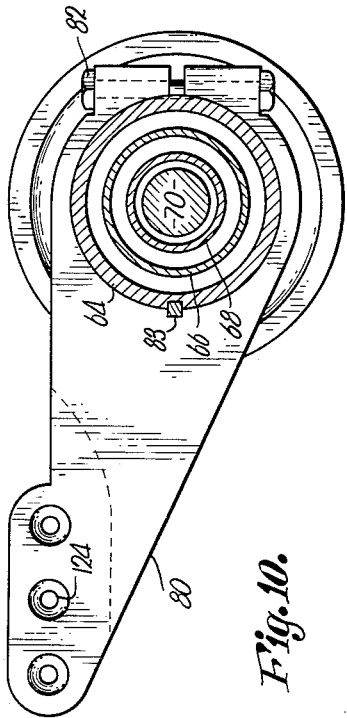
FIG. 10 is a view taken along line 10—10 of FIG. 9 showing a crank arm and its associated pulley.

As discussed above, the output or error signal from SCAT has heretofore been employed with an indicator to give the pilot a visual indication of the air speed error. This may serve as a check on the operation of the apparatus to be hereinafter described if SCAT is employed as the error signal source. If it is desired to utilize other sensing sources, such sources, in order to be appropriate for the circuitry to be hereinafter described, must be of the type wherein a D.C. error signal is generated in response to the sensors, and wherein the polarity of the error signal corresponds to deviations above or below a reference value.

Referring to FIG. 1, a sensing source 20 is shown for providing the error signal. The output of source 20 is coupled with a variable resistance 22 which forms the electrical input to a servomechanism to be hereinafter described and which serves as a sensitivity control. From resistor 22 the error signal is fed to an error rate filter 24 which converts the error signal into an error rate signal for application to the input of synchronous vibrator 26. The output from the synchronous vibrator is amplified by amplifier 28 and magnetic amplifier 30 and then utilized to drive a servomotor 32. The servomotor, through a mechanical linkage means 34 to be hereinafter described, actuates the throttles 36 of the aircraft which control the thrust of the engines 38. The air speed of the aircraft (or Mach number or other predetermined aerodynamic factors depending on the parameters sensed by source 20) then serves as the link between the engine thrust and sensing source 20 providing the error signal, this aerodynamic linkage being represented at 40. It may, therefore, be seen that the error signal output from source 20 is converted by a servo-mechanism into mechanical energy for actuating the aircraft throttles through means 34 to adjust the engine thrust to maintain the aircraft at proper air speed.

The various elements of the apparatus shown in FIG. 1 will now be dealt with individually in detail. Referring first to FIGS. 2, 3A and 3B, the function of the error rate filter 24 is illustrated. FIG. 2 shows a curve which illustrates a typical error signal from source 20. In FIG. 3A a curve is shown illustrating the response of the throttles to the output signal shown in FIG. 2. FIG. 3B graphs the corresponding change in engine thrust in response to the throttle movement shown in FIG. 3A. It is assumed, for purposes of explanation, that to maintain the referenced air speed it is necessary for the throttles of the aircraft to be increased from a setting of $S_1°$ to a setting of $S_2°$. This might occur, for example, if the flaps are suddenly lowered. It should be noted that the curves are plotted against time as the abscissa, and that the times $t_1$, $t_2$ and $t_3$ are time-related points on the respective curves.

Referring to FIG. 2, it may be seen that the configuration of the curve is divided into three curve portions 42, 44 and 46, curve portion 42 being that portion between the origin (O) and $t_1$, curve portion 44 being the portion between $t_1$ and $t_2$, and portion 46 being between $t_2$ and $t_3$. Curve portion 44 is substantially parallel with the time axis while portion 42 indicates an increase from no error signal to the level indicated by portion 44. Portion 46 indicates a decrease from the level represented by portion 44 to zero at $t_3$. In FIG. 3A the curve portions 48, 50 and 52 correspond to the portions 42, 44 and 46, respectively, of the curve in FIG. 2. The line 53 in FIG. 3B illustrates the linear response of the aircraft engines from O to $t_3$.

The error rate filter 24 comprises a capacitor 54 and a resistance 56 connected in parallel. Details of the remainder of the servomechanism and the linkage means 34 will be described hereinafter, it being assumed at this juncture that the system will properly respond to the error rate signal from the output of filter 24. Since the filter comprises a parallel connected capacitor and resistance, if resistance 56 is relatively high the rising signal level illustrated by curve portion 42 will tend to be anticipated by the error rate filter 24. This anticipation is with reference to the servo system response at the steady state or constant level illustrated by curve portion 44. A constant current, of course, will only be affected by the resistance 56; but if said resistance is maintained relatively high, a changing D.C. level will also flow across the capacitor 54 and thus the over-all impedance of the error rate filter 24 will appear to be reduced during that time in which the error signal is increasing. The significance of this effect is to increase the response of the servo system at the outset of the error signal and to prevent overshooting of Mach or air speed adjustments by taking into consideration the lag time between change in throttle position and the corresponding change in air speed.

It may be appreciated that the throttles would contine to advance in a given direction as long as the error signal remained of a given polarity. This would tend to cause oscillation of the throttles as there would necessarily be a certain degree of "overshoot." This is prevented by the error rate filter 24 since it also anticipates decrease of the level of the error signal along curve portion 46 to zero at time $t_3$. From 0 to $t_2$ the error signal is increasing or remaining constant. Thus, capacitor 54 becomes charged. After time $t_2$ the D.C. signal level decreases and the capacitor must then discharge. This discharge produces a signal in opposition to the error signal. Thus, from $t_2$ to $t_3$ the discharging capacitor opposes the polarity of the error signal and actually causes the throttles to be retarded such that the final throttle setting at time $t_3$ is $S_2°$, the value desired.

The resistance 56 is chosen to minimize the effects of inherent time lag between the rate of throttle movement and the rate of engine response. Because of this lag, the throttle movement must be subdued in order to eliminate oscillations and hunting. The capacitor 54 is then chosen to obtain a circuit time constant which permits proper anticipation of the changes in the D.C. level of the error signal from source 20. It should be understood that this time lag inherent in aircraft engines, jet or otherwise, makes this feature important to the operation of the present invention.

The graph in FIG. 3B shows the linear response of engine thrust corresponding to the non-linear movement of the throttle levers. This linear response occurs because the engines lag the throttle adjustments such that a substantially uniform increase is obtained between the initial engine power setting $P_1$ and the final setting $P_2$.

The variable resistance 22 serves as a sensitivity control to trim the total series resistance to a value for a given type of air frame. Being in series with the error rate filter 24, the variable resistance 22 also effects the error rate response. It may be appreciated that a smaller, more responsive aircraft differs widely from a large multiengine aircraft and that, therefore, some adjustment is needed to adapt the apparatus to a variety of aircraft. Resistance 22, of course, may be fixed for a given model of aircraft.

The synchronous vibrator 26, coupled to the output of the error rate filter 24, is a conventional device for converting the D.C. output of the error rate filter into an alternating current. The output of the synchronous vibrator is coupled with an amplifier 28 which drives a magnetic amplifier 30. Both amplifier 28 and magnetic amplifier 30 are conventional devices utilized in the servomechanism art. The magnetic amplifier 30 is coupled with the variable phase (control winding) of the servomotor 32. The servomotor then converts the electrical signal applied thereto into degrees of rotation of the servomotor shaft. The direction of rotation of the servomotor shaft corresponds to the polarity of the error rate filter output signal and the number of degrees of rotation in a given direction corresponds to the magnitude and duration of the filter output signal of a given polarity.

The servomotor 32 has a rate generator 58 mechanically coupled to its shaft for generating an A.C. signal of constant frequency but of amplitude proportional to servomotor shaft speed. Such rate generators are conventional devices commonly used in conjunction with servomotors. The output of the rate generator is coupled with the amplifier 28 to form a negative feedback loop for maintaining a constant servomotor torque gradient.

A constant torque gradient is utilized in the present invention to permit uniform response and movement of the throttle levers under varying friction loads. Uniform movement of all throttle levers, irrespective of the friction in the mechanical linkage connecting each of them to the corresponding engine, is essential if synchronous operation of all engines is to be accomplished without producing a yawing effect in the aircraft. Another advantage is gained by this method of operation in that a constant torque gradient prevents excessive swinging of the throttle levers thus minimizing undesirable engine surging.

In FIG. 1 it should be noted that the servo system may also be provided with means in the form of a r.p.m. limit sensor 59 for preventing nonlinear response of the aircraft engines at low r.p.m. Limit sensor 59 is coupled with the engines 38 and the magnetic amplifier 30 for preventing servomotor 32 from being excited to further retard throttles 36 when the nonlinear range is reached. (In typical jet engines the response of the engine to a change in throttle position becomes quite nonlinear when the engine r.p.m. falls below 40% of maximum r.p.m.) The limit sensor may comprise a tachometer sensing device coupled with an electromechanical relay or other means for interrupting the interconnection between the magnetic amplifier 30 and the servomotor 32 to prevent further actuation of the throttles until an increase in throttle position is requested by the error signal source 20 to once again bring the throttles into the linear response range. Such a tachometer limiting system may be designed to be responsive to a predetermined number of engines at the minimum r.p.m. or merely designed so that any one of the engines of a multiengine aircraft will interrupt servomotor operation if the servo system attempts to operate any engine below the predetermined minimum r.p.m.

Reference is now made to FIGS. 4–11 where the linkage means 34 illustrated diagrammatically in FIG. 1 is shown in detail. A frame 60 supports the servomotor 32 and its shaft 62. The frame also houses four concentric jackshafts 64, 66, 68 and 70. Belt and pulley assemblies 72, 74, 76 and 78 interconnect jackshafts 70, 68, 66 and 64, respectively, with the servomotor shaft 62. A crank arm 80 is rigidly attached to jackshaft 64 by such means as a bolt 82 and a keyway 83 engaged with a key on jackshaft 64. Similar crank arms 84, 86 and 88 are rigidly attached to jackshafts 66, 68 and 70, respectively, by such means as bolts 90, 92 and 94, respectively.

Figure 9:
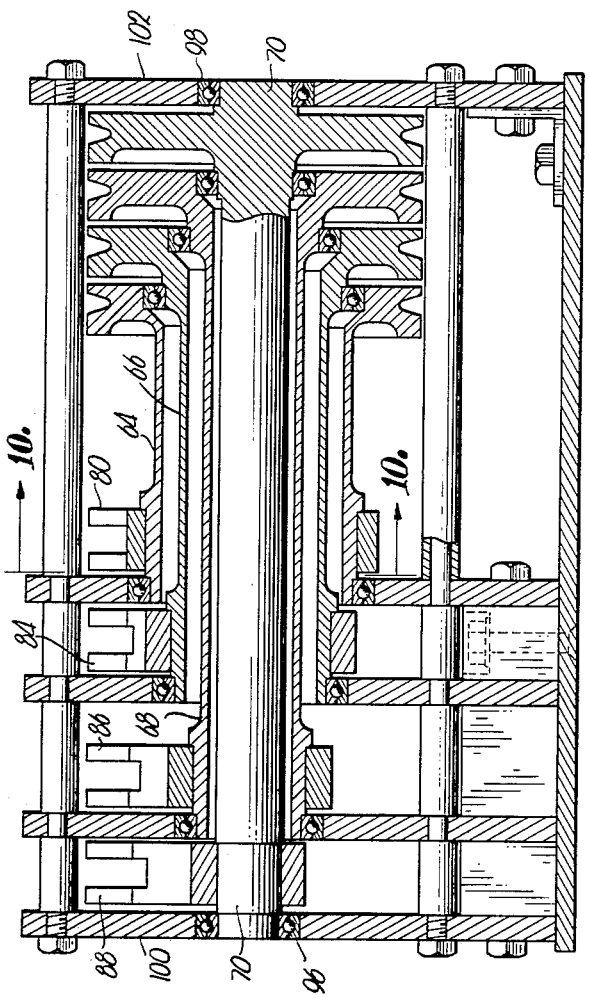
FIG. 9 is a horizontal section showing the jackshaft assembly.

The jackshaft and crank arm configuration is clearly shown in FIG. 9. Each jackshaft is independently rotatably suspended by bearing assemblies. Looking at the inner jackshaft 70, it may be seen that bearing assemblies 96 and 98 support the ends of the jackshaft between two frame walls 100 and 102 respectively. The left end of each of the remaining jackshafts, as viewed in FIG. 9, are also independently supported on frame walls. The right end of each of the jackshafts is provided with a pulley of the associated pulley assembly. The right ends of jackshafts 64, 66 and 68 are supported by bearing assemblies integral with the supported jackshaft and the immediate inner jackshaft which serves as a support.

The interconnection of the crank arms with the throttles of the aircraft is shown in FIG. 4. Links 104 and 106 are shown interconnecting crank arms 80 and 88 with throttles 108 and 110, respectively. Throttles 108 and 110 are rotatable about a shaft 111 and interconnected with the conventional linkage (not shown) utilized to couple the throttles with the engines. The two remaining crank arms, links and throttles are assumed to be in the same position as crank arm 88, link 106 and throttle 110. Therefore, they are hidden from view in the side elevation of FIG. 4. For purposes of illustration, the crank arm 80, link 104 and throttle 108 are shown in a different angular position from that of the remaining throttles so that the parallelogram linkage to be hereinafter described may be fully appreciated.

In the operation of multiengine aircraft it is often necessary to adjust one throttle independently from the remaining throttles. In fact, seldom in 4-engine aircraft are all four throttles set at exactly the same angular position. Therefore, it is necessary that the pilot be abe to actuate each throttle independently when the automatic control system is not in operation and be able to override any or all throttles when the automatic control system is operating. This is provided in the present invention by the provision of independently rotatable jackshafts with a slip clutch arrangement coupled with the pulleys on the servomotor shaft 62.

The aforesaid slip clutch arrangement is not shown in the drawings but forms a part of the servomotor shaft 62. Servomotors having this type of clutch arrangement on their output shafts are conventional apparatuses. One type suitable for use in the invention employs four friction clutches of the disc type which are placed in frictional engagement by the action of a solenoid when the servomotor is energized. One disc of each of the clutches is rigid with the servomotor shaft while the other disc of each clutch is secured to the respective pulley. These devices are provided with means for adjusting the friction force on each clutch independently of the other clutches to thereby permit the force required to override the action of each clutch to be precisely set. In this manner, it is evident that the pilot will be able to override the automatic control system if desired.

Although each throttle may be at a different angular setting, it is requisite that all throttles move an equal number of degrees when actuated by the automatic control apparatus. For example, in FIG. 4, it will be assumed that the throttles associated with crank arms 84, 86 and 88 are at a position corresponding to a 30° throttle setting and that the throttle 108 interconnected with crank arm 80 is at a setting of 50°. (Throttle settings are often indicated in terms of degrees of angular rotation measured from the "OFF" position as a base.) In the example, if the aerodynamic forces measured by the sensors of source 20 indicate that an increase in engine thrust is required, and if the amount of throttle advancement corresponding to such thrust is 5°, then it is necessary that all throttles be advanced 5° from their previous settings. In this case the three throttles corresponding to crank arms 84, 86 and 88 would be advanced to 35°, while throttle 108 would be advanced to 55°.

From the foregoing it may be appreciated that parallel linkage must be utilized in the mechanical coupling of the servomotor output with the throttles. To this end, the links are of equal length and the distance between the respective pivot points at the ends of the links are maintained constant during the advancement or the retarding of throttles. Since it is necessary that the parallel linkage be composed of precision components, it may be seen from FIG. 6 that the throttle interconnecting end of a typical link is bifurcated at end portion 112. A bearing assembly 114 shown in FIG. 7 is attached to each throttle such as by bolts 116. The bearing assembly 114 is shown in section in FIG. 8 wherein the outer race 118, inner race 120, and ball bearings 122 are clearly shown. The bifurcated end portion 112 of each of the links is slipped over the corresponding bearing assembly 114 and rigidly secured to the inner race 120 by such means as a pin or machine screw.

The crank arms 80, 84, 86 and 88 are provided with bifurcated ends for attachment with the respective links. Such bifurcated end portions may have a plurality of holes therethrough such as shown at 124 in FIG. 10. Such holes may be tapped to receive machine screws or utilized with pins to secure the crank arm to the end of the link. In FIG. 11 the crank arm interconnecting end 126 of a typical link is shown provided with a bearing 128, the inner race thereof being adapted to receive the pin or machine screw inserted in hole 124 so as to maintain said inner race rigid with the crank arm. FIG. 11 also illustrates that in construction the bearing containing ends of the links may be separately formed and then inserted into the tubular body of the link and welded or riveted in place.

In summary, the present invention utilizes the error signal from aerodynamic sensors to automatically control the settings of the aircraft throttles to maintain the aircraft at referenced air speed. The error signal is modified by the anticipatory action of the error rate filter 24 and coupled by properly adjusted servomechanism means to mechanical parallelogram linkage with the throttles. The result is that the inaccuracies of manual speed control are eliminated. It is believed that this will permit landings of jet aircraft with weather minimums as low as 100 feet altitude and one-quarter mile visibility. Such an achievement will permit the completion of many flights as scheduled where otherwise a flight might have to land at an alternate airport. It is also believed that the present invention will provide an increased safety margin for aircraft landings during high turbulence by accurately adjusting the throttles to more precisely maintain the required reference air speed.

An automatic aricraft throttle control apparatus, as described herein, was installed on a commercial four engine jet aircraft and the principle demonstrated to the Federal Aviation Agency. Their acceptance of the performance and airworthiness of the apparatus resulted in their release of a Supplemental Type Certificate permitting the use of this apparatus in scheduled airline service.

It should be appreciated that by merely altering the reference conditions the referenced air speed may be adjusted to allow automatic control of climb after take-off, aircraft cruising speed, or any other maneuvers or flight conditions wherein it is desired to maintain constant air speed. From an economic standpoint an important utilization of the present invention would be in the maintenance of constant cruising speed to thereby eliminate the fuel waste that is sustained as an aircraft slowly increases air speed following take-off due to the gradual consummation of its heavy fuel supply. It is estimated that a substantial saying in fuel could be achieved if the throttles were gradually retarded as such fuel is consumed rather than intermittent manual corrections being made periodically in the flight.

Having thus described the invention, what is claimed as new and desired to be secured by Letters Patent is:

1. In an aircraft having a device for generating a direct current error signal when the aircraft deviates from a referenced air speed, and wherein the polarity of the error signal for air speeds above the referenced air speed is opposite to the polarity for air speeds below the referenced air speed, apparatus responsive to the error signal for controlling the throttles of the aircraft engines to automatically maintain the aircraft at the referenced air speed, said apparatus comprising:

an error rate filter responsive to said error signal and coupled with the output of said device for providing an error rate signal, said filter including a capacitor connected in parallel with an impedance;

amplifier means;

a servomotor having an electrical control input and a rotatable output shaft;

means coupling the input of said amplifier means with the output of said filter;

means coupling said electrical control input with the output of said amplifier means, said servomotor including structure for converting the output signal from said amplifier means into degrees of rotation of said shaft;

a rate generator operably coupled with said shaft;

circuit means interconnecting the output of said rate generator with said amplifier means for providing negative feedback control of the servomotor to maintain constant the servomotor torque gradient;

a limit sensor operably coupled with the engines of the aircraft and said amplifier means for interrupting the output of the amplifier means when the revolutions per minute of a preselected number of aircraft engines are below a predetermined minimum value;

a number of concentric, independently rotatable jackshafts corresponding to the number of engine throttles;

a belt and pulley assembly for each jackshaft operably coupling the latter with the servomotor shaft, the pulleys on the servomotor shaft being slippable with respect thereto to thereby permit the pilot of the aircraft to override the apparatus; and parallel linkage including a crank arm rigid with each jackshaft and a link for each crank arm, one end of each link being pivotally attached to the corresponding crank arm, the other end of each link being pivotally attached to the respective throttle, whereby the throttles are advanced or retarded to maintain the aircraft at the referenced air speed.

2. In an aircraft having a device for generating a direct current error signal when the aircraft deviates from a referenced air speed, and wherein the polarity of the error signal for air speeds above the referenced air speed is opposite to the polarity for air speeds below the referenced air speed, apparatus responsive to the error signal for controlling the throttles of the aircraft engines to automatically maintain the aircraft at the referenced air speed, said apparatus comprising:

an error rate filter responsive to said error signal and comprising an input connection adapted for coupling with the output of said device, a resistive element, a capacitive element coupled in parallel with said resistive element, an output connection, and circuit means coupling each of said elements in series between said connections;

amplifier means;

a servomotor having an electrical control input and a rotatable output shaft;

means coupling the input of said amplifier means with the output connection of said filter;

means coupling said electrical control input with the output of said amplifier means, said servomotor including structure for converting the output signal from said amplifier means into degrees of rotation of said shaft;

a rate generator operably coupled with said shaft;

circuit means interconnecting the output of said rate generator with said amplifier means for providing negative feedback control of the servomotor to maintain constant the servomotor torque gradient;

a limit sensor operably associated with at least certain of the engines of the aircraft and said amplifier means for interrupting the output of the amplifier means during reduction of the speed of said certain engines into the nonlinear throttle response range thereof; and means for coupling said shaft with said throttles, whereby the throttles are advanced or retarded by the servomotor to maintain the aircraft at the referenced air speed.

3. Apparatus for automatically controlling the throttle of an engine of an aircraft to maintain the aircraft at a referenced air speed, said apparatus comprising:

a servomotor having an electrical control input and a rotatable output shaft;

error responsive means for sensing deviations of the aircraft from said referenced air speed and for generating a control signal to operate said servomotor in response to said deviations;

means coupling said electrical control input of the servomotor with the output of said error responsive means, said servomotor including structure for converting the control signal from said error responsive means into degrees of rotation of said shaft;

a rate generator operably coupled with said shaft;

circuit means coupling the output of said rate generator with said error responsive means for providing negative feedback control of the servomotor to maintain constant the servomotor torque gradient;

a limit sensor operably associated with said engine of the aircraft and said error responsive means for interrupting the output thereof during reduction of the speed of said engine below a predetermined level of engine response; and means for coupling said shaft with said throttle, whereby the throttle is advanced or retarded by the servomotor to maintain the aircraft at the referenced air speed.

4. In an aircraft having a device for generating an error signal when the aircraft deviates from a referenced air speed, apparatus responsive to the error signal for automatically controlling the throttle of an engine of the aircraft to maintain the aircraft at the referenced air speed, said apparatus comprising:

a servomotor having an electrical control input and a rotatable output shaft;

motor drive means responsive to said error signal for providing a control signal to operate said servomotor, said drive means having an input connection adapted for coupling with the output of said device and an output connection for delivering said control signal;

means coupling said electrical control input of the servomotor with the output connection of said drive means, said servomotor including structure for converting the control signal from said drive means into degrees of rotation of said shaft;

a rate generator operably coupled with said shaft;

circuit means coupling the output of said rate generator with said drive means for providing negative feedback control of the servomotor to maintain constant the servomotor torque gradient;

a limit sensor operably associated with said engine of the aircraft and said drive means for interrupting the output of the drive means during reduction of the speed of said engine below a predetermined level of engine response; and means for coupling said shaft with said throttle, whereby the throttle is advanced or retarded by the servomotor to maintain the aircraft at the referenced air speed.

References Cited by the Examiner

UNITED STATES PATENTS

| 2,608,104 | 8/52 | Feeney et al. | 244—83 X |
| 2,626,767 | 1/53 | Bromley | 244—77 |
| 2,664,254 | 12/53 | Hendrickson | 244—76 |
| 2,948,496 | 8/60 | Joline | 244—76 |
| 3,003,314 | 10/61 | Irwin et al. | 60—39.28 |

OTHER REFERENCES

Handbook of Automation Computations and Control, vol. 1, pages 23–30.

MILTON BUCHLER, *Primary Examiner.*

ANDREW H. FARRELL, *Examiner.*